US005966281A

United States Patent [19]

Larson

[11] Patent Number: 5,966,281

[45] Date of Patent: Oct. 12, 1999

[54] CIRCUIT BREAKER WITH THERMAL SENSING UNIT

[75] Inventor: Brett E. Larson, Cedar Rapids, Iowa

[73] Assignee: Square D Company, Palatine, Ill.

[21] Appl. No.: 09/073,493

[22] Filed: May 6, 1998

[51] Int. Cl.[6] .......... H02H 5/04

[52] U.S. Cl. .......... 361/103; 361/105; 361/49; 361/99

[58] Field of Search .......... 361/42, 43, 45, 361/49, 93, 94, 102–103, 105–106, 56–57, 99

[56] References Cited

U.S. PATENT DOCUMENTS

| | | | |
|---|---|---|---|
| 3,716,757 | 2/1973 | Rodriguez | 361/105 |
| 4,344,958 | 8/1982 | Davidson et al. | 361/45 |
| 4,616,200 | 10/1986 | Fixemer et al. | 335/35 |
| 4,816,958 | 3/1989 | Belbel et al. | 361/93 |
| 5,245,302 | 9/1993 | Brune et al. | 335/35 |
| 5,250,918 | 10/1993 | Edds et al. | 335/35 |
| 5,302,787 | 4/1994 | Edds et al. | 200/401 |

OTHER PUBLICATIONS

"Bimetal Technology," Demaich Industries, Inc. Brochure, (No date) 70 Mill St. Johnston, RI 02919.

*Primary Examiner*—Michael J. Sherry
*Attorney, Agent, or Firm*—Kareem M. Irfan; Larry I. Golden

[57] ABSTRACT

A circuit protection apparatus includes a circuit breaker coupled in series with a circuit to be protected. The circuit breaker has a trip input and is responsive to a trip signal at the trip input for changing from a closed circuit condition to an open circuit condition to thereby remove electrical current from the circuit to be protected. A thermal trip element is coupled in series with the circuit to be protected and is responsive to a predetermined current/time characteristic of current flow in the circuit for delivering the trip signal through the thermal trip element to the trip input.

20 Claims, 1 Drawing Sheet

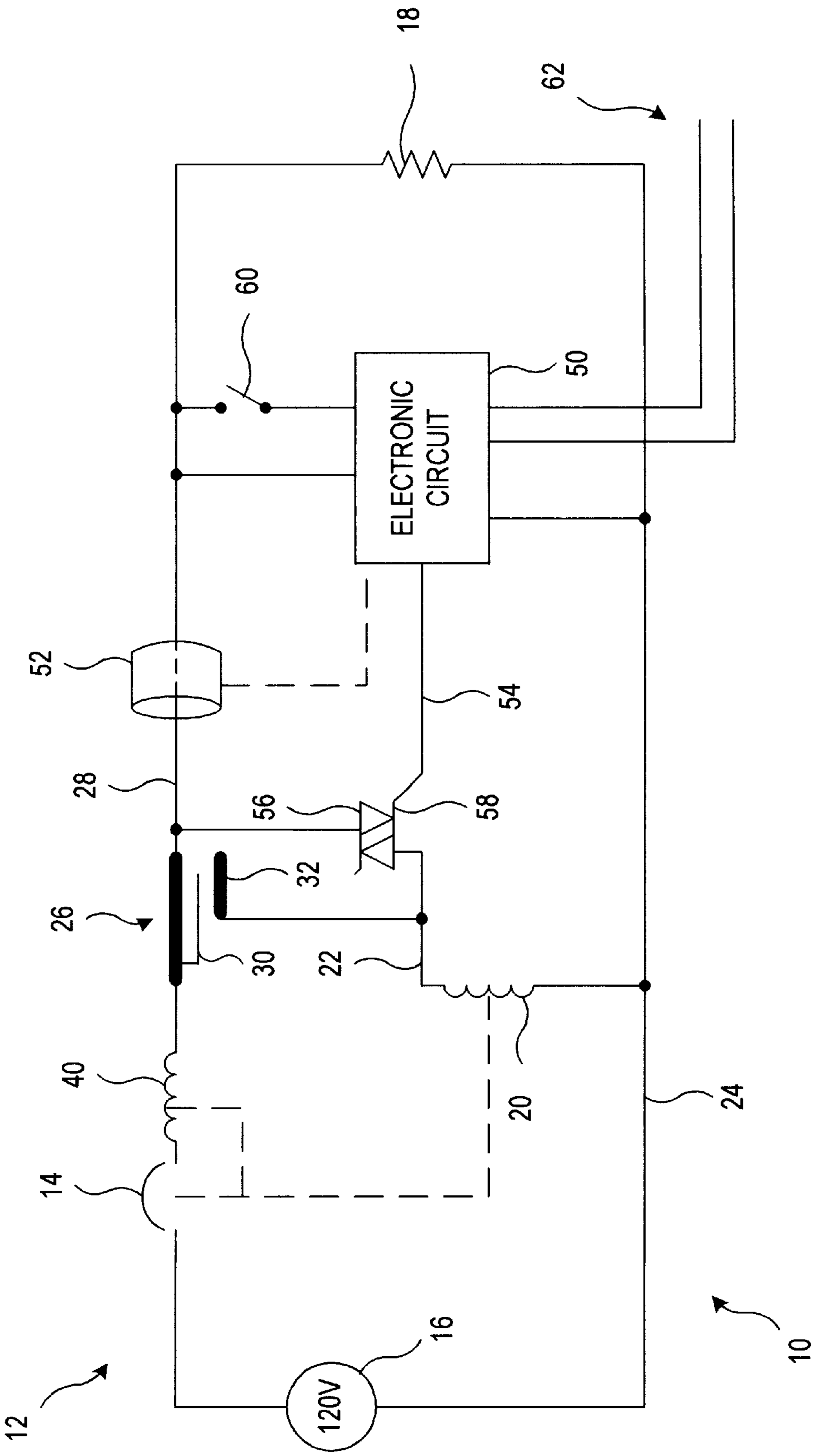
ELECTRONIC CIRCUIT
120V
10
12
14
16
18
20
22
24
26
28
30
32
40
50
52
54
56
58
60
62

CIRCUIT BREAKER WITH THERMAL SENSING UNIT

FIELD OF THE INVENTION

The present invention relates to electrical circuit protective devices such as circuit breakers and, more particularly, to a circuit breaker arrangement which employs a thermal sensing unit or initiating tripping of the circuit breaker.

BACKGROUND OF THE INVENTION

Electrical systems in residential, commercial and industrial applications usually include a panelboard for receiving electrical power from a utility source. The electrical power is then delivered from the panelboard to designated branch circuits supplying one or more loads. Typically, various types of protective devices are connected to the branch circuits. The protective devices may be mounted within the panelboard or external to the panelboard.

Circuit breakers are a well known type of protective device which are designed to trip open and interrupt an electric circuit in response to detecting overloads and short circuits. Overload protection is often provided by a thermal element which, when heated by the increased current, will cause the circuit breaker to trip and interrupt the power. This can occur when too many loads draw power from the same branch circuit at the same time, or when a single load draws more power than the branch circuit is designed to carry. Short circuit protection is often provided by an electromagnetic or "magnetic" coil element that trips the breaker when a high current flows through the coil. Additionally, many circuit breakers include ground fault interruption (GFI) circuitry to protect against ground faults which are defined as current flowing from a hot conductor to ground.

In many circuit breaker designs, the thermal element comprises a bimetallic element which supply the mechanical energy or work to delatch the circuit breaker in the event of a current overload condition. That is, the bimetallic element must work against the latching force of the circuit breaker to unlatch and open the circuit breaker. The force required to open the circuit breaker is dependent on the latch load and the surface friction of the latch. The latch load is a function of the force required at the circuit breaker contacts. Therefore, the bimetallic element must be sized and designed to supply the required force and deflection to delatch the circuit breaker mechanism.

Since the latch surface friction and latch load will vary from one type of circuit breaker to another, as well as between circuit breakers of the same type, a number of manufacturing problems arise. For example, a number of different bimetallic elements specifically designed for different types of circuit breakers must be designed and manufactured. Moreover, calibration of circuit breakers of the same type is complicated by the mechanical tolerance differences between individual units. Even within a given circuit breaker, the latch force will vary somewhat over the service life of the unit, since each time the circuit breaker is tripped and relatched, some variation in these mechanical forces will occur. Also, the latch surface is often contaminated over time with dust and other debris.

The electromagnetic element for short circuit protection usually uses a so-called magnetic coil. However, in many units the thermal and magnetic trip mechanisms are highly integrated, such that normal operation of the thermal trip system will directly affect the operation of a magnetic trip system, although usually not vice-versa. Thus, for example, ambient compensation for the thermal trip system will change the magnetic trip level. More particularly, as the ambient temperature increases or decreases, the magnetic gap is increased or decreased due to the thermal adjustments of a thermal compensator which is a part of the thermal trip system.

The bimetallic element used in the thermal overload protection or trip system usually is required to be a cantilevered type of bimetallic element. Snap-acting bimetallic elements have been used in relatively lower power circuit breakers. One of the main advantages of using a snap-acting bimetallic element is the capability for thermal calibration during the bimetal manufacturing process in such snap action elements. This can permit the manufacture of a thermal trip system for a circuit breaker which does not require calibration after assembly, therefore reducing production costs. However, due to the limited amount of deflection available in a snap-acting bimetallic element, use of such elements has heretofore been limited to relatively low current, low voltage applications. Because of the relatively small amount of the deflection, the air gap provided in a snap acting bimetallic element has been considered not useable in circuit breakers of higher current, voltage and interrupting ratings.

In the above-mentioned present designs which integrate thermal and magnetic trip units, stamped and formed parts have been required by this integration of the elements. However, we have found that design of the magnetic trip unit alone, without the requirement of integrating thermal trip elements allows for the elimination of stamped and formed parts and the use of molded features. Molded features are typically more precise and repeatable than stamped and formed parts. The use of molded features in the magnetic unit, and the use of a snap-acting bimetallic element in the thermal trip unit would also tend to improve the durability, e.g. shock resistance, of the trip systems. The neutral line is usually not brought in to the breaker in conventional designs employing thermal and magnetic trip elements.

Electronic circuit breaker arrangements are also known and used. In such electronic circuit breakers, a sensing element such as a current transformer coil senses a current flowing through a wire which passes through the sensor coil. An electronic circuit is responsive to the signal produced by the sensor coil or other sensor element for tripping the circuit breaker if this signal has certain predetermined characteristics. Such electronic circuit breakers may be used not only for overcurrent or short circuit protection, but also for arcing fault interruption. That is, the electronic circuit can be arranged to sense characteristics of the incoming sensor signal indicative of the existence of an arcing fault, and produce a trip signal for tripping the circuit breaker in response to such signal conditions.

OBJECTS OF THE INVENTION

Accordingly, it is a general object of the invention to provide a novel and improved circuit breaker which overcomes the above-discussed problems of the prior art.

A related object is to provide a novel and improved circuit breaker having independent thermal and magnetic trip systems.

A related object is to provide an improved circuit breaker employing a thermal trip device.

Briefly, and in accordance with the foregoing, a thermally activated circuit protection apparatus for a circuit having a given line voltage comprises a circuit breaker coupled in series with a circuit to be protected, said circuit breaker having a trip input and being responsive to a predetermined signal at said trip input for changing from a closed circuit condition to an open circuit condition to thereby remove electrical current from said circuit to be protected, and a thermal trip element coupled in series with said circuit to be protected and responsive to a predetermined current/time characteristic of current flow in said circuit for delivering said predetermined signal through said thermal trip element to said trip input.

BRIEF DESCRIPTION OF THE DRAWINGS

In the drawings:

The FIGURE is a circuit schematic of a circuit protection apparatus in accordance with the invention.

DETAILED DESCRIPTION OF THE ILLUSTRATIVE EMBODIMENT

While the invention is susceptible to various modifications and alternative forms, specific embodiments have been shown by way of example in the drawings and will be described in detail herein. However, it should be understood that the invention is not intended to be limited to the particular details disclosed. Rather, the invention is to cover all modifications, equivalents and alternatives falling within the spirit and scope of the invention as defined by the appended claims.

Referring now to the drawing, a circuit protection apparatus in accordance with the invention is shown in circuit schematic form, and designated generally by the reference numeral 10. The protection apparatus 10 includes a circuit breaker 12 having breaker contacts 14 which are generally in series with a circuit to be protected, for example a 120 VAC circuit having a power source 16 and a load 18. The breaker contacts 14 are in series between the source 16 and the load 18.

The circuit breaker 12 includes a mechanism for tripping the breaker contacts to an open circuit position for interrupting the circuit from the source 16 to the load 18. In the illustrated embodiment, an electromagnetic trip coil element 20 is responsive to a predetermined signal at a trip signal input 22 for causing the breaker contacts to change from a closed circuit condition to an open circuit condition. Other specific mechanisms might be utilized for this purpose without departing from the invention. Thus, in the illustrated embodiment, the trip coil 20 has one end coupled to a neutral or return line 24 of the circuit, such that its opposite end comprises the trip input 22 for the circuit breaker 12. In the embodiment shown, the application of a predetermined current (determined by selection of the impedance of the trip coil 20) at the line voltage to the input 22 will cause the trip coil to energize and open the breaker contacts 14.

A thermal element 26, which in the illustrated embodiment comprises a bimetallic element, is coupled in series with the line side 28 of the circuit to be protected, that is, in series between the source 16 and the load 18. The thermal element 26 is responsive to a predetermined current/time characteristic of the current flowing in the line circuit 28 for deforming so as to complete a circuit through the thermal element from the line 28 to the trip input 22 of the circuit breaker 12. In this regard, the trip element may be of a number of designs, but in the illustrated embodiment comprises a snap-action bimetallic element having a deformable member or blade 30 which will deflect to engage a contact portion or element 32 in response to a given current/time characteristic flowing through the thermal element 26. The contact element 32 is coupled to the trip input 22. This engagement between the elements 30 and 32 will deliver line voltage to the input 22 of the trip coil 20 in order to cause the breaker contacts to go to an open circuit condition. In one embodiment, the breaker contacts may be arranged such that they thereafter remain latched in the open circuit condition until a mechanical force is applied to reclose the breaker contacts 14. For example, the contacts 14 could be closed again upon ascertaining and correcting the circuit fault or other condition which caused the thermal element to initially deliver a trip signal to the trip coil 20.

The thermal element 26 may take a number of forms without departing from the invention. For example, any one of a number of bimetallic snap action elements which are available from Demaich Industries, 70 Mill Street, Johnston, R.I. might be selected for a particular application. These elements include snap disks, snap blades, taylor blades and related assemblies. It will be understood that the thermal or bimetallic element 26 shown in the drawing is shown only in schematic form, for purposes of illustration. The actual mechanical details and features of a bimetallic element (snap-action or otherwise) and the manner of its placement and interaction relative to other elements of the circuit and of the breaker may vary considerably. Such details are to be considered as falling within the scope of the invention.

The foregoing placement and operation of the thermal element is in contrast to many present circuit breaker designs in which the thermal element itself provides the mechanical force for unlatching the breaker contacts 14. In the present design a snap-action bimetallic element can be used as the thermal element 26, due to the novel configuration of the circuit breaker and thermal trip arrangement as described above.

The embodiment illustrated also includes an electromagnetic overcurrent trip element in the form of a magnetic coil 40. Advantageously, this electromagnetic trip arrangement is independent of the thermal element 26, unlike many circuit breakers currently in use in which the magnetic and thermal elements are integrated. Thus, the magnetic coil 40 is also electrically in series in the line side of the circuit 28 between the source 16 and the load 18. In response to a given magnitude of current through the magnetic coil 40, the magnetic coil 40 directly activates the breaker contacts 14 to unlatch the breaker 12 to its open circuit condition. In this regard, the magnetic coil 40 may be physically wound concentrically with the trip coil 20, if desired.

The foregoing arrangement of the magnetic coil 40 and thermal element 26 are also advantageously employed in conjunction with an electronic circuit breaker or protection system wherein an electronic circuit 50 receives an input signal from a current sensing coil or current transformer 52 and makes a decision based upon this input signal whether or not to produce a trip signal at an output 54. This trip signal output is used to provide a signal for energizing the trip input 22 of the circuit breaker 12, in the manner described below.

In the illustrated embodiment, as described above, this trip input 22 comprises one end of the trip coil 20, which is responsive to the application of line current for unlatching the breaker contacts 14. In the illustrated embodiment, a switching element or device such as a triac 56 is coupled between the line circuit 28 and the trip input 22 and has a gate or control input 58 which is coupled to the trip signal output 54 of the electronic circuit 50. Thus, when the gate or control input 58 of the switching device 56 is energized by the trip signal given by the electronic circuit at trip signal output 54, the switching element 56 provides the line voltage at the trip input 22 of the trip coil 20, causing the trip coil to unlatch the breaker contacts 14.

In accordance with conventional design, the electronic circuit may also include a push to test (PTT) switch 60 and a shunt trip signal output 62 for use in connection with other features of the electronic trip circuit 50. Briefly, closure of the push to test switch 60 may test the electronic circuit and the integrity of the other circuit components. The electronic circuit is arranged such that operation of the push to test switch 60 should cause the electronic circuit to produce a trip signal at its trip signal output 54, thereby causing the breaker contacts 14 to be latched to their open circuit condition in the manner described above.

What has been illustrated and described herein is a novel circuit protection apparatus employing a thermally activated feature. Various other features including an electromagnetic trip element and a current sensor and electronic circuit may also be employed in combination with the thermal trip arrangement of the invention.

What is claimed is:

1. A thermally activated circuit protection apparatus for a circuit having a given line voltage, said circuit protection apparatus comprising:

a circuit breaker coupled in series with a circuit to be protected, said circuit breaker having a trip input and being responsive to a predetermined electrical signal at said trip input for changing from a closed circuit condition to an open circuit condition to thereby remove electrical current from said circuit to be protected; and a thermal trip element coupled in series with said circuit to be protected and responsive to a predetermined current/time characteristic of current flow in said circuit for delivering said predetermined electrical signal through said thermal trip element to said trip input.

2. The apparatus of claim 1 wherein said predetermined signal comprises said given line voltage and wherein said thermal trip element is deformable in response to said predetermined current/time characteristic for completing a circuit between a line side of the circuit to be protected and said trip input.

3. The apparatus of claim 1 wherein said thermal trip element comprises a bimetallic element.

4. The apparatus of claim 1 wherein said circuit breaker comprises a set of breaker contacts in series with the circuit to be protected and a trip coil operatively coupled with said breaker contacts and defining said trip input, such that said breaker contacts are latched to an open circuit condition in response to energization of said trip coil with a predetermined current at said line voltage.

5. The apparatus of claim 4 wherein said thermal trip element is configured for delivering said preselected current at said line voltage to said trip coil in response to said predetermined current/time characteristic of current flow in the circuit to be protected.

6. The apparatus of claim 5 wherein said thermal trip element is deformable in response to said predetermined current/time characteristic for completing a circuit between a line side of the circuit to be protected and said trip input.

7. The apparatus of claim 6 wherein said thermal trip element comprises a snap action bimetallic element.

8. The apparatus of claim 2 wherein said thermal trip element comprises a bimetallic element.

9. The apparatus of claim 5 wherein said thermal trip element comprises a bimetallic element.

10. The apparatus of claim 4 and further including a magnetic coil in series circuit with said circuit to be protected and operatively associated with said set of breaker contacts for latching said breaker contacts to an open circuit condition in response to a predetermined magnitude of current flowing in said circuit to be protected.

11. The apparatus of claim 10 and further including a current sensor for sensing the current in the circuit to be protected and for producing a corresponding sensor output signal, switching means coupled between a line side of said circuit to be protected and said trip coil and having a control input responsive to a control signal for switching to a closed circuit condition for energizing said trip coil, and a control circuit operatively coupled with said current sensor and responsive to said output signal from said current sensor being at or above a given level for producing said control signal at said control input of said switching device.

12. The apparatus of claim 1 and further including a current sensor for sensing the current in the circuit to be protected and for producing a corresponding sensor output signal, switching means coupled between a source of said predetermined signal and said trip input and having a control input responsive to a control signal or switching to a closed circuit condition for coupling said predetermined signal to said trip input, and a control circuit operatively coupled with said current sensor and responsive to said output signal from said current sensor being at or above a given level for producing said control signal at said control input of said switching device.

13. A circuit protection apparatus for a circuit having a given line voltage, said circuit protection apparatus comprising:

a circuit breaker coupled in series with a circuit to be protected, said circuit breaker having a trip input and being responsive to said given line voltage at said trip input for changing from a closed circuit condition to an open circuit condition to thereby remove electrical current from said circuit to be protected; and a thermal trip element coupled in series with said circuit to be protected and responsive to a predetermined current/time characteristic of current flow in said circuit for delivering said line voltage through said thermal trip element to said trip input.

14. The apparatus of claim 13 wherein said circuit breaker comprises a set of breaker contacts in series with the circuit to be protected and a trip coil operatively coupled with said breaker contacts and defining said trip input, such that said contacts are latched to an open circuit condition in response to energization of a trip coil with a predetermined current at said line voltage.

15. The apparatus of claim 14 and further including a magnetic coil in series circuit with said circuit to be protected and operatively associated with said set of breaker contacts for latching said breaker contacts to an open circuit condition in response to a predetermined magnitude of current flowing in said circuit to be protected.

16. The apparatus of claim 13 and further including a current sensor for sensing the current in the circuit to be protected and for producing a corresponding sensor output signal, switching means coupled between a line side of said circuit to be protected and said trip input and having a control input responsive to a control signal for switching to a closed circuit condition for coupling said line voltage to said trip input, and a control circuit operatively coupled with said current sensor and responsive to a said output signal from said current sensor being at or above a given level for producing said control signal at said control input of said switching device.

17. The apparatus of claim 14 and further including a current sensor for sensing the current in the circuit to be protected and for producing a corresponding output signal, switching means coupled between a line side of said circuit to be protected and said trip coil and having a control input responsive to a control signal for switching to a closed circuit condition for energizing said trip coil, and a control circuit operatively coupled with said current sensor and responsive to said output signal from said current sensor being at or above a given level for producing said control signal at said control input of said switching device.

18. The apparatus of claim 15 and further including a current sensor for sensing the current in the circuit to be protected and for producing a corresponding output signal, switching means coupled between a line side of said circuit to be protected and said trip coil and having a control input responsive to a control signal for switching to a closed circuit condition for energizing said trip coil, and a control circuit operatively coupled with said current sensor and in responsive to a said output signal from said current sensor being at or above a given level for producing said control signal at said control input of said switching device.

19. The apparatus of claim 13 wherein said thermal trip element comprises a bimetallic element.

20. The apparatus of claim 14 wherein said thermal trip element comprises a bimetallic element.

* * * * *